United States Patent
Wayne

Patent Number: 5,157,377
Date of Patent: Oct. 20, 1992

[54] HOOD SCOOP ASSEMBLY

[76] Inventor: Mark Wayne, 29436 Briarbank Ct., Southfield, Mich. 48034

[21] Appl. No.: 519,286

[22] Filed: May 4, 1990

Related U.S. Application Data

[63] Continuation-in-part of Ser. No. 4,616, Jan. 20, 1987, abandoned, and a continuation-in-part of Ser. No. 201,328, May 27, 1988, abandoned, and a continuation-in-part of Ser. No. 308,810, Feb. 9, 1989, Pat. No. 4,996,442.

[51] Int. Cl.⁵ .................. B60Q 1/00; B62D 25/10
[52] U.S. Cl. .................... 340/468; 340/461; 340/472; 362/80; 180/69.2
[58] Field of Search .......... 340/468, 461, 472, 473; 362/80, 83.3; 180/68.3, 69.2; 296/91

[56] References Cited

U.S. PATENT DOCUMENTS

| | | | |
|---|---|---|---|
| 2,270,587 | 1/1942 | Hall | 362/80 |
| 2,831,176 | 4/1958 | Liberto | 362/80 |
| 3,110,882 | 11/1963 | Stuerzl et al. | 340/461 |
| 3,481,119 | 12/1969 | McKinlay | 180/68.3 |
| 4,729,072 | 3/1988 | Oroza | 362/80 |
| 4,761,718 | 8/1988 | Allen | 340/472 |

Primary Examiner—Donnie L. Crosland
Attorney, Agent, or Firm—Gifford, Groh, Sprinkle, Patmore and Anderson

[57] ABSTRACT

A hood scoop assembly for selective placement upon an external surface of an automotive vehicle, a boat and the like comprises a hood scoop body portion having a front end portion, a back end portion and an underside. Removably fittable in the underside of the back end portion is a panel unit. The panel unit may be either a filler panel having an insignia or a name placed thereupon, or may be a signalling and indicating box unit that is situated facing the driver to thereby visually deliver to the driver pertinent information relating to the operating condition of the vehicle. The panel unit is held either to a flange situated along the back end portion or may be disposed within a channel defined on the underside of the hood scoop body and positioned approximately at the back end portion thereof.

20 Claims, 2 Drawing Sheets

HOOD SCOOP ASSEMBLY

This is a continuation-in-part of U.S. Ser. No. 004,616 filed Jan. 20, 1987 (now abandoned), and a continuation-in-part of U.S. Ser. No. 201,328 filed May 27, 1988 (now abandoned), and a continuation-in-part of U.S. Ser. No. 308,810 filed Feb. 9, 1989 and now U.S. Pat. No. 4,996,442 issued Feb. 26, 1991.

BACKGROUND OF THE INVENTION

I. Field of the Invention

The present invention relates generally to hood scoop assemblies for automotive vehicles, boats and the like. More particularly, the present invention relates to hood scoop assemblies having removable panel units which may either be decorative units or units fitted with signalling or indicating lamps and readouts.

II. Description of the Relevant Art

Automobile design has long included adaptations loosely known as "hood scoops" ever since it was discovered that additional cooling air could be directed toward the engine compartment therethrough. Mostly hood scoops were after market fixtures that were fitted strategically to the engine hoods of cars by "hot rodders", although some scoops were provided by the manufacuter as original equipment such as was supplied on the now-classic 1955–1957 Ford Thunderbird.

The use of hood scoops has not been limited to application as air capturing and directing fixtures, however. The placement of a non-functioning hood scoop on the engine hood of an automobile adds a "racy" look to the vehicle, even though the scoop serves no practical function other than enhancing overall aesthetic appeal.

While the conventional hood scoop is forward facing with the opening of the scoop facing the direction of travel, other scoops have been reversed, with the opening facing the rear of the automobile.

To this end, no modification of the hood scoop is known that improves on the utility or appearance of the conventional hood scoop. Accordingly, the presence of the hood scoop on most automobiles offers little other than the additional streamlined appearance and attempts to overcome the limitations of known scoops have failed.

SUMMARY OF THE PRESENT INVENTION

The present invention provides a hood scoop assembly which significantly improves upon the function and appearance of hood scoops for automotive vehicles and the like. The scoop of the present invention may also be fitted to the bow cover of a boat.

The hood scoop assembly for selective placement upon an external surface of an automotive vehicle, a boat and the like according to the present invention comprises a hood scoop body portion having a front end portion, a back end portion, an underside which defines an interior, and a panel unit.

The scoop body defines a gradual taper beginning at the front end and flaring gradually toward the back end. Thus constructed, the "open" end of the scoop faces the driver.

A panel unit is removably fittable at the "open" end of the scoop body. The panel unit may be a plate that is either plain or the panel can include one or more designs. Alternatively, the panel unit may be a box unit having a covering plate fitted with selective masking that displays information related to the status of the vehicle such as engine speed, speed, temperature and the like. A compass may be provided for directional information, this being particularly advantageous when the scoop is adapted for use on a boat. In this latter embodiment, the box unit includes appropriate lighting and electronic readouts.

The hood scoop body preferably includes a flange at its "open" or back end. The flange may either define a number of downward depending, cantilevered stud members to which the box unit may be fitted or may define a peripheral ridge having an interior-facing lip. The lip has a panel receiving side to which the panel is attached by fasteners.

When the box unit is selected for attachment to the cantilevered stud members, a number of barbed clips are fitted to the top side of the box unit for interfitting with the stud members. The barbed clips include a channel having two substantially parallel walls, each wall having an interior facing surface which has a plurality of barbs fixed thereto. The barbed clips lock the stud members therein.

In lieu of the attachment of the panel unit to a flange, the panel unit may be interfittable with a channel defined in the underside of the hood scoop body. The channel is positioned perpendicularly with respect to the longitudinal axis of the hood scoop body.

The body is preferably composed of a polymerized material such as a plastic or a hard rubber.

The present invention offers a more universal utility over known hood scoops in that it provides the driver with pertinent information in the preferred embodiment, thereby improving not only the aesthetic appeal of the vehicle, but also improving its overall function. In the other embodiment which does not utilize the information center of the scoop, advertisement and the like may be situated on the panel unit, thereby also improving the utility of the hood scoop assembly.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENTS OF THE PRESENT INVENTION

Figure 1:
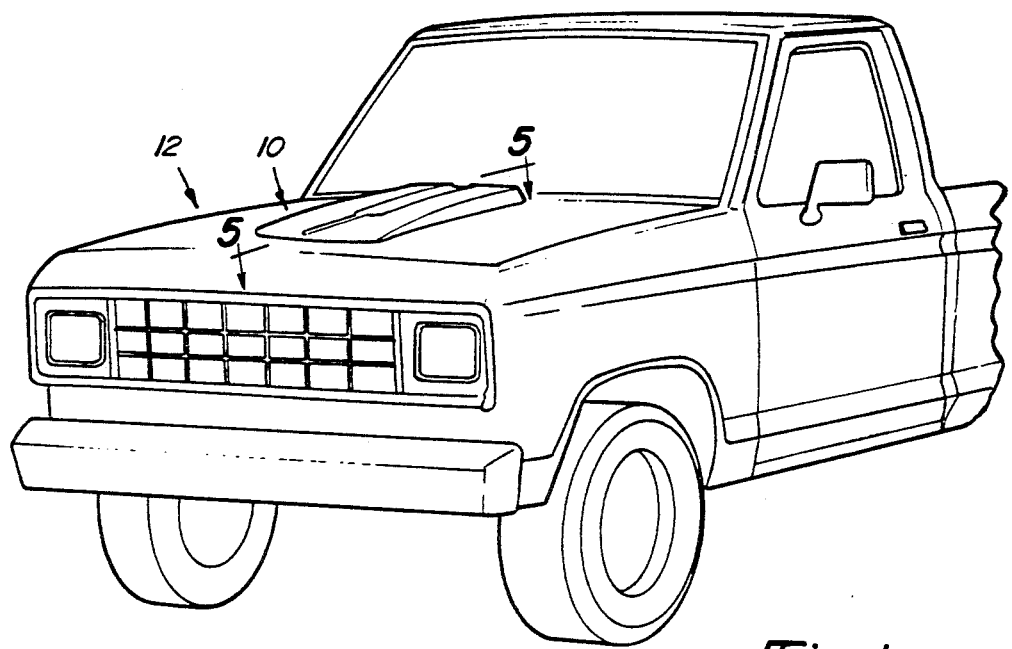
FIG. 1 is a perspective view illustrating the present invention in place upon the engine hood of an automotive vehicle.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a hood scoop assembly, generally indicated as 10, is illustrated in place fixed upon the engine hood of an automotive vehicle 12. As illustrated, the scoop assembly 10 is generally situated on the engine hood with the "open" end of the assembly 10 facing rearward, or in the general direction of the windshield of the vehicle 12. The vehicle 12 is illustrated as being a truck, although the scoop assembly 10 of the present invention is adaptable to other vehicles.

Figure 2:
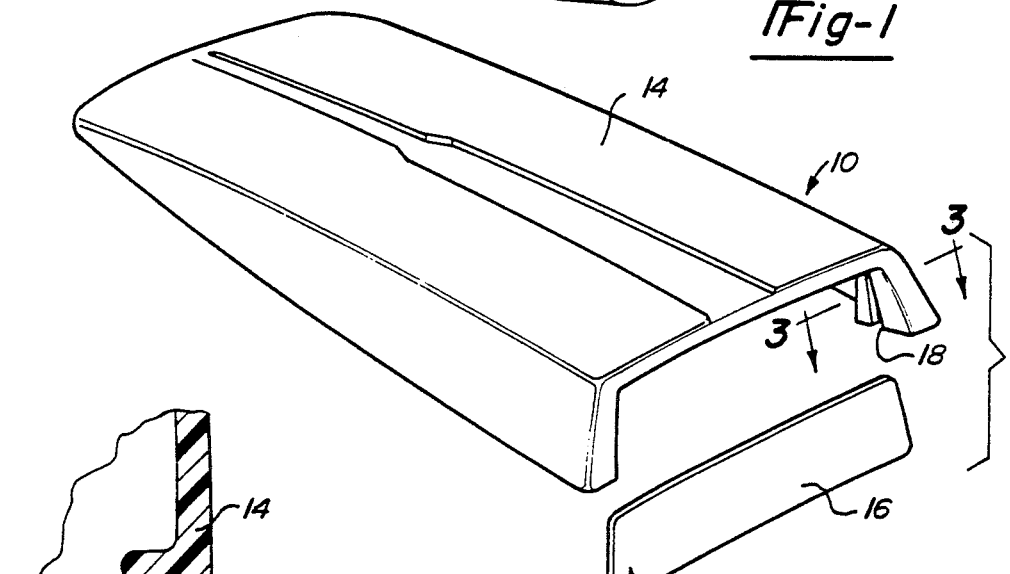
FIG. 2 is a perspective view of an embodiment of the present invention showing a plate unit detached therefrom.

Referring to FIG. 2, a perspective view of a preferred embodiment of the scoop assembly 10 according to the present invention is illustrated. The assembly 10 comprises a scoop body 14 and a plate unit 16. The body 14 presents a tapered appearance when viewed from the side, thereby adding to the overall streamlined appearance of the vehicle to which it is fitted. According to this embodiment, the plate unit 16 comprises a substantially flat plate which is removably fitted within a channel 18 defined in the rear end portion of the body 14. The plate unit 16 may be plain in appearance or may be presented with writing or figures thereupon.

Figure 3:
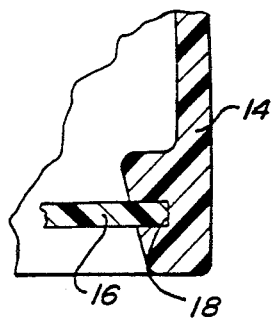
FIG. 3 is a view taken along line 3—3 of FIG. 2.

Referring to FIG. 3, a sectional view taken along line 3—3 of FIG. 2 is shown to illustrate how the plate unit 16 is slottingly fitted into the channel 18.

As an alternate method to the channel 18 of holding the plate unit 16 to the scoop body 14, a flange 20 peripherally defined about the "open" end of the scoop body 14 may be provided and may include a plate attachment lip 22 for removably receiving the plate unit 16 thereupon. The plate unit 16 may be attached thereto by means of a fastener 24.

Figure 4:
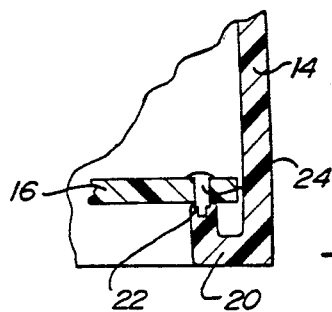
FIG. 4 is an alternate attachment construction of the assembly shown in FIG. 3.

Whether the method of attachment of the plate unit 16 is the channel 18 of FIG. 3 or the flange 20 of FIG. 4, the plate unit 16 may be interchanged with other plate units of similar dimensions.

Figure 5:
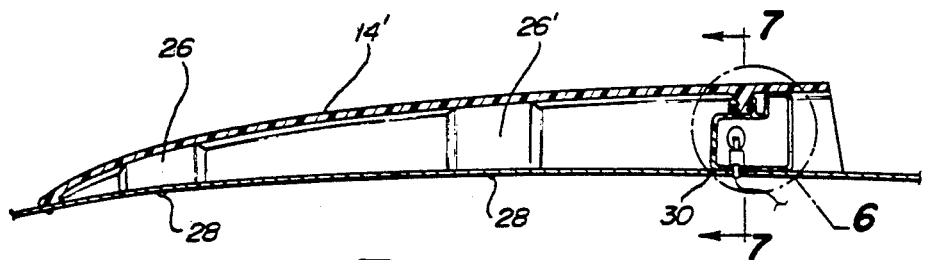
FIG. 5 is a view taken along line 5—5 of FIG. 1.

Referring to FIG. 5, an alternate embodiment of the scoop assembly 10 is shown and includes a scoop body 14'. The scoop body 14' of the embodiment described hereafter is substantially the same as the body 14, except for the construction of the "open" end.

Illustrated in the sectional view as shown in FIG. 5, a pair of supports 26, 26' may be seen, beneath which are included a plurality of scoop fasteners 28.

Near the "open" end of the scoop body 14' is situated a plate unit assembly 30. This unit assembly may be more clearly seen in FIG. 6.

Figure 6:
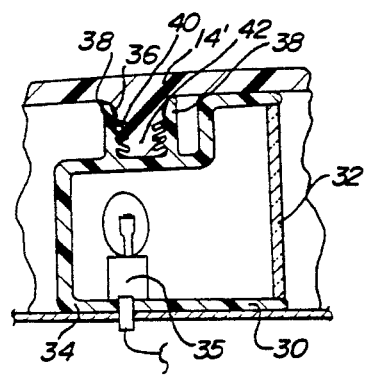
FIG. 6 is an enlarged detailed view of the encircled segment 6 of FIG. 5 illustrating the preferred embodiment of the present invention directed at the box unit of the panel unit.

With respect to FIG. 6, a detailed view of the plate unit assembly 30 is shown and includes a cover plate 32 and a housing 34. The cover plate 32 is preferably interchangable. According to the preferred embodiment of the present invention, the cover plate 32 has defined thereon selected visual information directed at the operating condition of the vehicle including such information as engine speed, road speed, oil temperature, water temperature and the like. A lighting assembly 35 is provided to convey the pertinent visual signal. Of course, although the assembly 35 is disclosed as being a conventional bulb, a light-emitting diode may be substituted therefor.

The housing 34 is interfitted to the underside of the scoop body 14' by a number of barbed channel fasteners 36. The fasteners 36 each includes a pair of parallel, spaced apart walls 38, 38' having a plurality of barbs 40 downwardly depending therefrom. As illustrated, the barbs 40 are functionally engaged to a stud member 42 depending from the underside of the body 14'.

Figure 7:
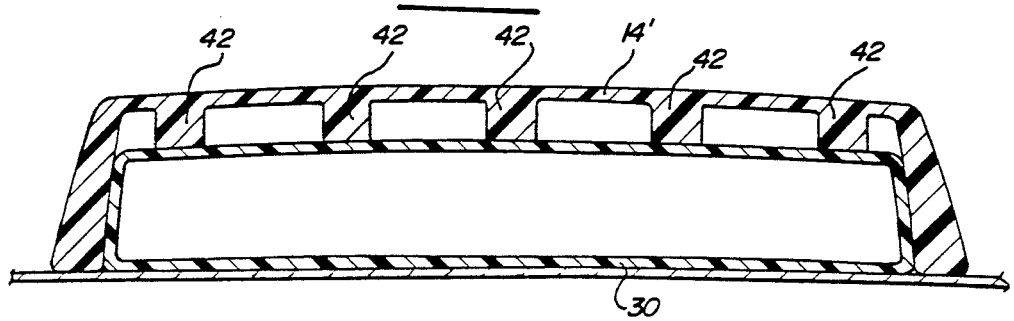
FIG. 7 is a view taken along line 7—7 of FIG. 5.

FIG. 7 illustrates the arrangement of the stud members relative to the scoop body 14' and the housing 30. Of course, this arrangement may be modified somewhat depending upon, for example, the width of the scoop body 14'.

Figure 8:
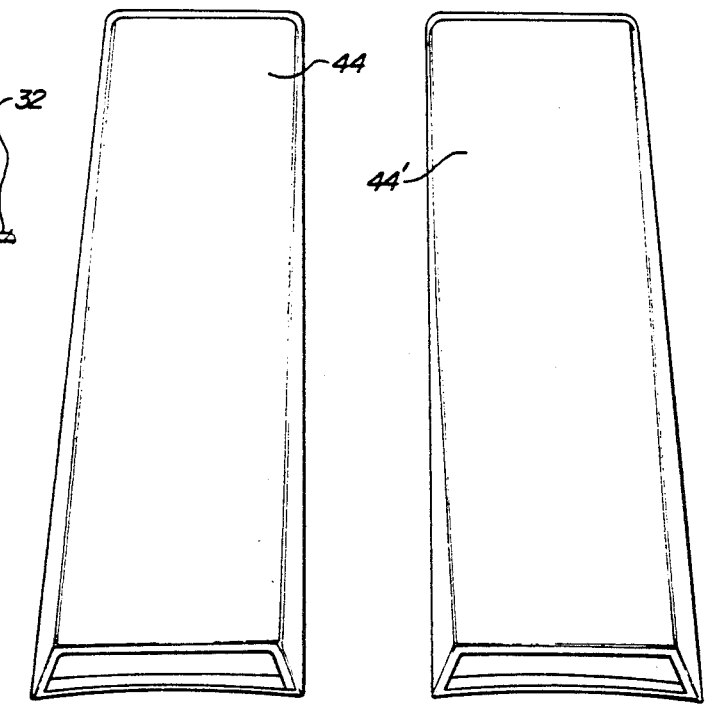
FIG. 8 is another embodiment of the present invention illustrating a pair of spaced apart hood scoop assemblies.

FIG. 8 discloses a pair of scoop bodies 44, 44' that may be preferably situated in a side-by-side relationship. In any event, the scoop bodies 44, 44' are provided with one or the other of the plate assemblies disclosed and described above.

Having described my invention, however, many modifications thereto will become apparent to those skilled in the art to which it pertains without deviation from the spirit of the invention as defined by the scope of the appended claims.

I claim:

1. A hood scoop assembly for use with a vehicle having a passenger compartment, a windshield and a hood portion extending forward of said windshield, said assembly comprising:
   a scoop body having a front end portion, a back end portion, and an underside;
   means for attaching said underside of said scoop body to said hood portion so that said panel is positioned forward of the windshield;
   a panel unit removably insertable in said back end portion of said body;
   said back end portion having a recess for releasably attaching said panel unit;
   said panel unit having a front side and a back side;
   said panel unit being interchangable with other panel units; and
   wherein when said panel unit is received in said recess said front side is selectively viewable to the occupants of said vehicle.

2. The hood scoop assembly of claim 1 wherein said means for releasably attaching includes one or more barbed clip fasteners.

3. The hood scoop assembly of claim 2 wherein said panel unit includes a box assembly, said box assembly having a front side, a back side, a top side and a bottom side.

4. The hood scoop assembly of claim 3 wherein said front side includes a removably interchangable panel.

5. The hood scoop assembly of claim 4 wherein said box assembly includes at least one means for indicating the operation of said vehicle, a boat or the like to the occupants thereof.

6. The hood scoop assembly of claim 5 wherein said means for indicating the operation of an automotive or marine vehicle comprises a bulb.

7. The hood scoop assembly of claim 6 wherein said top side of said box assembly includes at least one barbed clip fastener fitted thereon.

8. The hood scoop assembly of claim 7 wherein said clip fastener comprises a U-shaped channel having a pair of spaced apart walls, each of said spaced apart walls having an interior side, each interior side being fitted with a plurality of downward-depending barbs.

9. The hood scoop assembly of claim 8 wherein said back portion of said underside of said body includes a plurality of cantilevered stud members, the number of said stud members being equal to the number of barbed clip fasteners whereby said barbed clip fasteners and said stud members fittingly interconnect.

10. The hood scoop assembly of claim 9 wherein said panel has signal indicia marked thereon by selective masking whereby said means of operation indication may be shown therethrough.

11. The hood scoop assembly of claim 1 wherein said underside of said body defines an interior and wherein said body has a longitudinal axis, said body further includes an end flange, said end flange being positioned perpendicularly to said longitudinal axis so as to keep said panel visible only to the operator of an automotive vehicle.

12. The hood scoop assembly of claim 11 wherein said means for attaching comprises a channel defined on said end portion of said underside for receiving said panel unit therein, said channel being spaced apart from and parallel to said end flange.

13. The hood scoop assembly of claim 11 wherein said flange includes a lip facing said interior of said body, said lip defining a surface for removably receiving said panel unit thereupon.

14. The hood scoop assembly of claim 13 wherein said panel unit is held against said lip by a plurality of removable fasteners.

15. A hood scoop assembly for use with a vehicle having a passenger compartment, a windshield and a hood portion extending forward of said windshield, said hood scoop assembly comprising:
   a hood scoop body having a longitudinal axis, an underside, a front end, a back end, and an underside;
   means for attaching said underside of said scoop body to said hood portion so that said panel is positioned forward of the windshield;
   said body further having a flange member defined at its back end, said flange member being situated perpendicularly to said longitudinal axis of said hood scoop body; and
   a panel unit removably attached to said flange member, said panel unit having a front side and a back side.

16. The hood scoop assembly of claim 15 wherein said panel unit includes means for signalling and indicating operating conditions relating to said automotive vehicle.

17. A hood scoop assembly for use with a vehicle having a passenger compartment, a windshield and a hood portion extending forward of said windshield, said hood scoop assembly comprising:
   a hood scoop body having a longitudinal axis, an underside, a front end, a back end, and an underside;
   means for attaching said underside of said scoop body to said hood portion so that said panel is positioned forward of the windshield;
   said body further having a flange member defined at its backs ends, said flange member being situated perpendicularly to said longitudinal axis of said hood scoop body so as to keep said front of said hood scoop visible only to vehicle occupants; and
   means indicating operating conditions relating to said automotive or marine vehicle, said means indicating conditions being removably attachable to said flange member.

18. The hood scoop assembly of claim 17 wherein said means for operation indication comprises a panel unit having a display face.

19. The hood scoop assembly of claim 18 wherein said means for operation indication is attachable to said flange member by one or more of a barbed clip.

20. The hood scoop assembly of claim 18 wherein said flange includes an interior lip, said means for operation indication being fitted thereupon.

* * * * *